Aug. 1, 1939.    J. W. KITTREDGE    2,168,164
SPEED REDUCER
Original Filed July 31, 1935    3 Sheets-Sheet 1

Inventor:
John W. Kittredge

Aug. 1, 1939. J. W. KITTREDGE 2,168,164
SPEED REDUCER
Original Filed July 31, 1935 3 Sheets-Sheet 2

Inventor
John W. Kittredge

Patented Aug. 1, 1939

2,168,164

UNITED STATES PATENT OFFICE 2,168,164

SPEED REDUCER

John W. Kittredge, New York, N. Y.

Continuation of application Serial No. 34,079, July 31, 1935. This application November 6, 1937, Serial No. 173,251

21 Claims. (Cl. 74—305)

This application is a continuation of my prior patent application for Speed reducers, Serial No. 34,079, filed July 31, 1935.

Electric motors and some other motors run preferably at high speed, generally at much higher speed than the machines they drive, and it is necessary to reduce speed by belting, gearing or other means therebetween. In some cases, it may be necessary to increase the speed. Again, gears in general are unyielding, and spring gears and spring couplings have been devised to relieve shock. It is difficult to get sufficient spring material into a rapidly rotating part to give it appreciable cushion or yield without making it big and cumbersome, and without having its weight slightly eccentric in some position of the spring.

The objects of my invention are:

1st. To have the reducer supported at one end by a shaft and in driving engagement therewith through gears symmetrically arranged therearound, thus effecting uniform distribution of load, and turning moment only with no transverse pressure on the shaft, and thus also eliminating unnecessary shafts placed end to end, and so economizing room.

2nd. To have the opposite end of the reducer supported by a flexible joint to compensate small errors of alignment.

3rd. To cushion the drive by resilient non-rotating parts engaging the reaction member; to have them big enough to give ample resilience with small motion and fatigue of the parts themselves; to have them not exert transverse pressure and friction on rotating shafts; and to have them not cause undue friction or wedging of the gear teeth.

4th. To have the reducer operate in forward and reverse directions; to have the reaction member oscillate on its supports; and to have the leverage and therefore the force of the resilient parts increase as the reaction member moves from its neutral position.

5th. To have all parts simple to construct and strong and durable, and to have them easily accessible when assembled for use.

Figure 2:
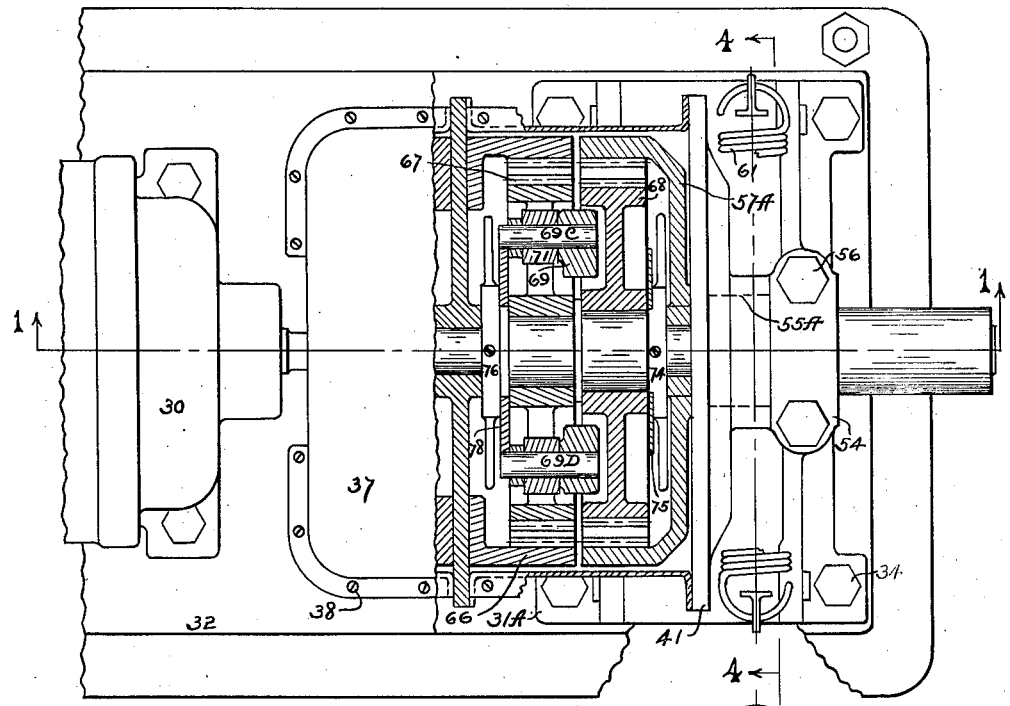
Figure 1:
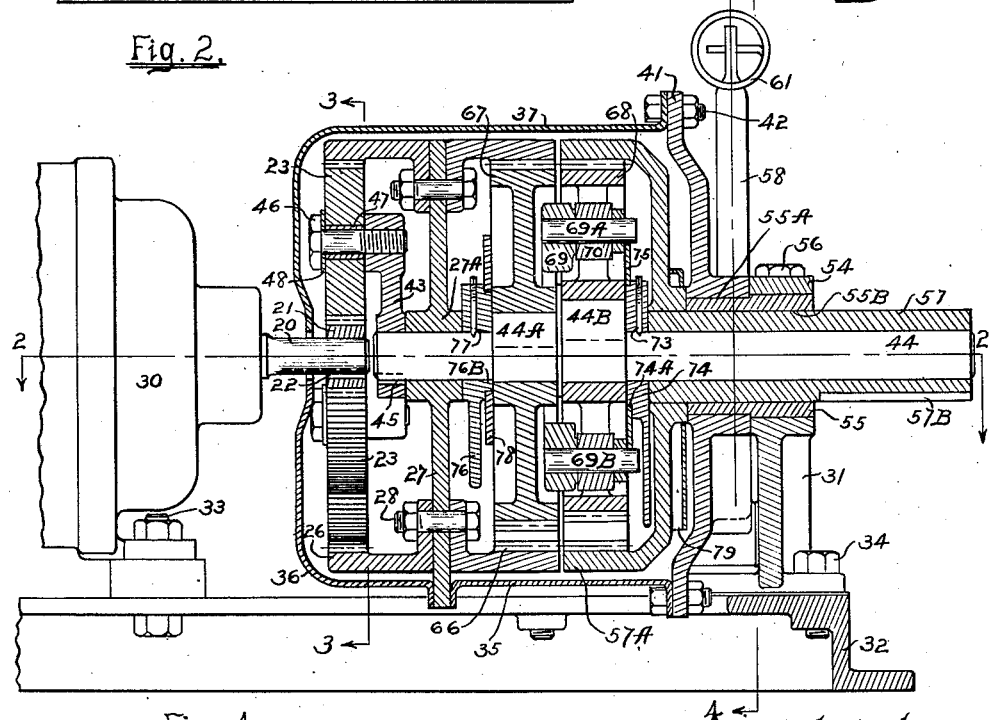
Figure 3:
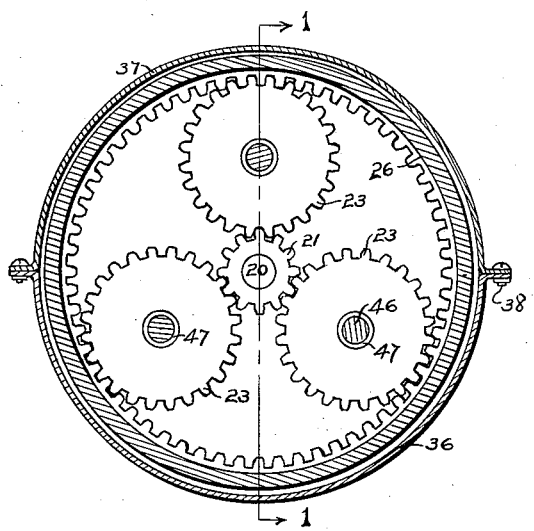
Figure 6:
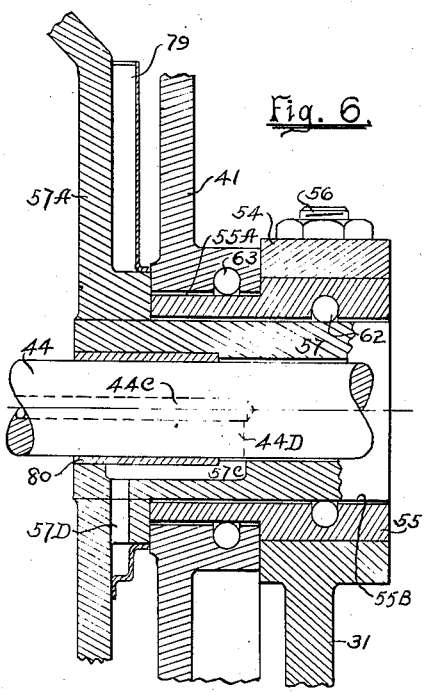
Figures 4, 5:
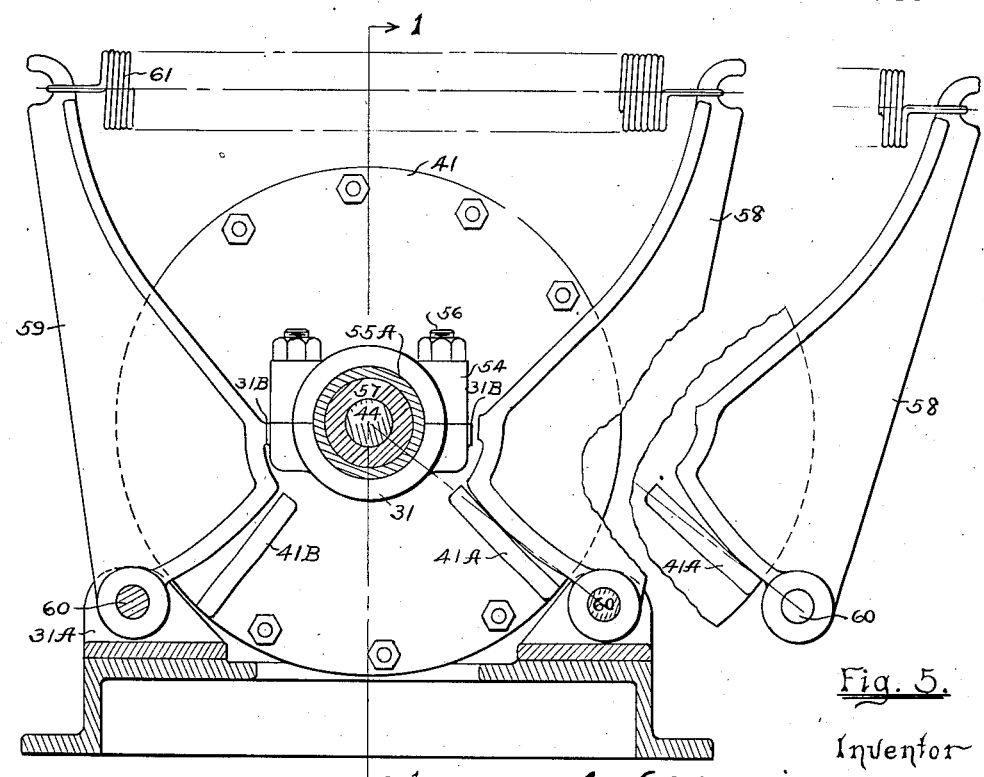
Figure 7:
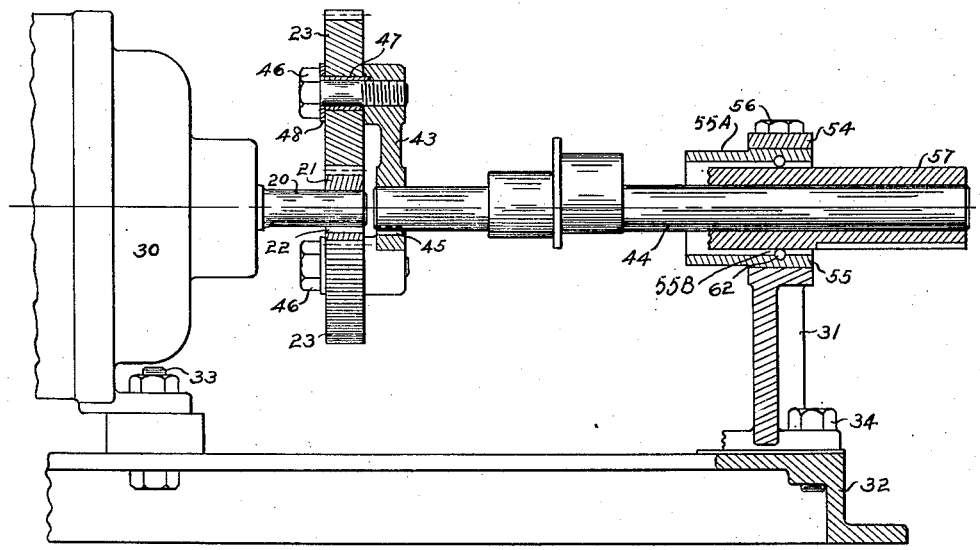
Figure 8:
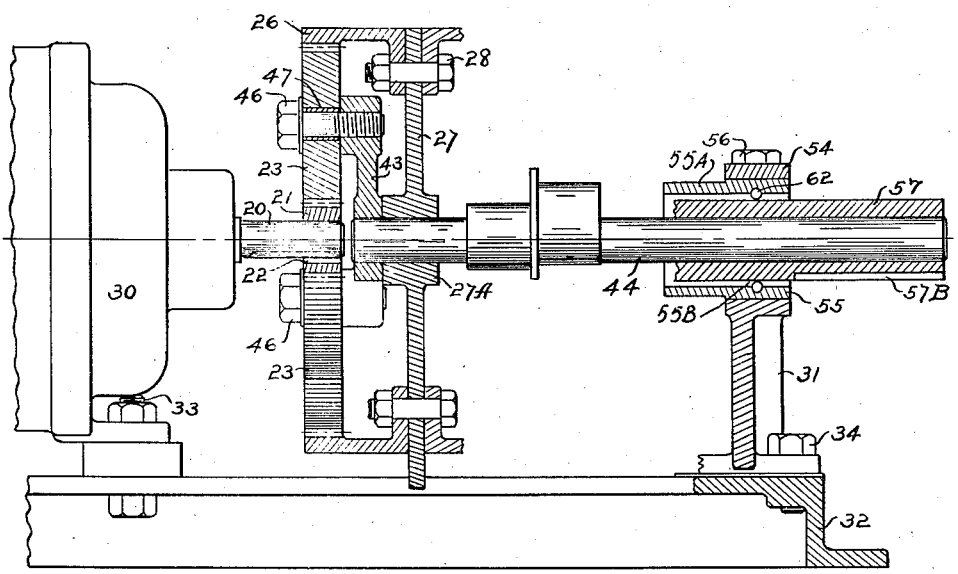

I attain these objects by the mechanism shown in the accompanying drawings in which:

Fig. 1 is a vertical longitudinal section on line 1—1 of Figs. 2, 3 and 4. Fig. 2 is a plan with parts in section on line 2—2 of Fig. 1. Fig. 3 is a cross-section on line 3—3 of Fig. 1. Fig. 4 is a cross-section on line 4—4 of Figs. 1 and 2. Fig. 5 is a similar section showing a different position of casing and lever. Fig. 6 is a vertical longitudinal partial section similar to Fig. 1, but enlarged to show the bearings more clearly. Fig. 7 is again a vertical longitudinal section similar to Fig. 1, but stripped down to its fundamentals in order to show them more clearly. Fig. 8 is a vertical longitudinal section similar to Fig. 7, but showing a few more of the salient parts.

A given part carries the same number throughout the several views. For clearness of description, a given part is designated by a numeral, as 41, and different edges or faces of that part by that numeral with letters, as 41A, 41B, 41C, etc. Two parts cast together and integral are cross-hatched alike.

Bearing bracket 31 is bolted to base 32 by bolts 34. (See Fig. 7.) Cap 54 is screwed down on bearing bracket 31 by bolts 56, and it clamps sleeve 55 tightly in place. Hollow shaft 57 runs in internal bearing 55B of sleeve 55, and this is preferably a ball bearing 62 as shown in Figs. 6, 7 and 8. Shaft 57 is slow speed, and the object of the ball bearing is not so much to reduce friction as to permit slight misalignment. Shaft 44 runs inside hollow shaft 57.

Motor 30 is bolted to base 32 by bolts 33. Motor shaft 20 carries gear 21 held to said shaft by key 22. Spider 43 with three arms is keyed rigidly on the end of shaft 44 by key 45. Three bolts 46 are screwed tightly into spider 43 (with sleeves 47 as shown). On sleeves 47, run three gears 23, preferably 120 degrees apart. Gears 23 mesh with motor gear 21 and are supported by said motor gear. (See Fig. 3.) Gears 23, through bolts 46 and spider 43, support the end of shaft 44. Thus shaft 44 is supported at one end by motor shaft 20 and motor gear 21, and at the opposite end by bearing bracket 31, preferably through ball bearing 62. As gear 21 supports the adjacent end of the drive through its engagement with the three gears 23, it must always drive equally on said three gears, effecting uniform distribution of load, with no transverse pressure on shaft 21 except the weight of the drive. And this weight is usually small compared with the driving torque.

Each bolt 46 has a sleeve 47 and a washer 48, with clearance to allow gear 23 to run freely. Sleeve 47 interlocks with washer 48 and with spider 43 as shown in Fig. 7. As bolt 46 screws tightly down, it locks the sleeve and the washer to the spider, and rotating gear 23 has no tendency to unscrew the bolts.

*The reaction member.*—Annular gear 26 is bolted to diaphragm 27 by bolts 28. Casing members 35 and 36, preferably steel stampings, are fastened rigidly to diaphragm 27 as by welding, and thus form one rigid piece, the bottom half of the casing. Casing cover 37, also a steel stamping, is bolted to bottom 35 and 36 by bolts 38. And casing end piece 41 is bolted to casing 35 and cover 37 by bolts 42. Annular gear 26, diaphragm 27 and casing members 35—36—37—41 are thus fastened rigidly together. They are restrained from rotation as hereinafter described, and we consider them to be the reaction member. The casing is adapted to hold oil.

Sleeve 55 has, beside its internal bearing 55B above described, an external bearing 55A shown in Figs. 6, 7 and 8. Ball bearing 63 carries end piece 41 on external bearing 55A, and thus carries the adjacent end of the reaction member.

Shaft 44 runs in bearing 27A of diaphragm 27. And the three gears 23 above described mesh with annular gear 26. Gears 23 may carry the adjacent end of reaction member 26—27—35—36—37—41 by tooth contact with gear 26, as if the bearing 27A were bored excessively large. Or, if said bearing is close fitting and the gear teeth have large clearance, said gears 23 may carry the adjacent end of said reaction member through hub or bearing 27A. In any case, the end of the reaction member is supported by gears 23 and, through them, by motor gear 21 and motor shaft 20. As driving gear 21 drives, gears 23 rotate on their own axes and also follow around annular gear 26 and are thus planetary.

Two levers 58 and 59 are pivoted on pins 60 which are fixed in feet 31A of bearing bracket 31. The levers are connected at the top by tension spiral spring 61. Two lugs 41A and 41B are integral with end piece 41 of the reaction member. At rest or running idly, reaction member 41 is in its neutral position, the upper ends of lugs 41A and 41B engage the two levers, and the levers engage lugs 31B of bearing bracket 31. When power is being transmitted, reaction member 41 moves forward or back, presses one lever as 58 back from lugs 31B, and stretches spring 61. (See Fig. 4.) As the power and the torque increase, they press the lever farther back as in Fig. 5. As the torque increases, the point of contact and the line of force move from the upper end to near the lower end of lug 41A, approaching the fulcrum 60 and receding from the fulcrum 55A. With both lever arms changing, the spring 61, with small amount of stretch, controls a large increase of power. This not only takes care of variable amounts of power regularly transmitted, but gives appreciable yield and relieves shock when a large amount of power is suddenly applied. And the total stretch of the long spring causes a very small amount of stretch in each coil thereof, not enough to cause great fatigue. The levers 58 and 59 engage the lugs 41A and 41B in line with bearing 55A, as shown in Figs. 1 and 2. The heavy pull of the spring is thus transmitted to stationary bearing 55A on which is only a slight oscillatory movement. None of that pull is transmitted to the running parts inside the bearing; none of it is transmitted to the support on the rapidly running motor shaft 20; and none of it tends to keep the gears from running correctly on their pitch lines. And the figures show the mechanism symmetrical on forward and backward drive.

To disassemble the reducer, release spring 61 and take off cap 54 and cover 37. Then remove bolt 46 (uppermost bolt as shown in Fig. 1) and slip out gear 23 between gear 21 and annular gear 26. Then turn the reducer half over and lift it out.

Any kind of drive may be used to drive hollow shaft 57 from shaft 44. Or hollow shaft 57 may be eliminated altogether and shaft 44 may be the driven shaft.

In the embodiment herein shown, annular gear 66 is bolted to diaphragm 27 by bolts 28. Shaft 44 has integral with it an eccentric 44A. Said eccentric carries gear 67 which meshes with annular gear 66. Annular gear 57A is rigid with hollow shaft 57, and is preferably cast solid thereon. Shaft 44 has integral with it another eccentric 44B. Said eccentric carries gear 68 which meshes with annular gear 57A. Gears 67 and 68 are held to the same angular motion by ring 69. Rigid in ring 69, are two pins 69C and 69D projecting from one side thereof, and two other pins 69A and 69B projecting from the opposite side thereof, said pins being 90 degrees apart as shown. Pins 69C and 69D carry rollers 71 which run in radial slots in gear 67, and pins 69A and 69B carry rollers 70 which run in radial slots in gear 68. And these cause the gears 67 and 68 to turn together always. The two pairs of meshing gears are in different ratio, and this transmits rotary motion from shaft 44 to hollow shaft 57. Shaft 57 is then the driven shaft with keyway 57B for gear or coupling.

The drive thus comprises two sets of gears in sequence. Spur gears 21 and 23 and annular gear 26 are the first set. Spur gears 67 and 68 and annular gears 66 and 57A are the second set. And shaft 44, the driven member of the first set, is the driving member of the second set.

In the description and claims herein, "gear train," "drive connection," and similar expressions are used to mean the direct power transmitting members. In general, they are rotating members. But these expressions are not used herein to mean or to include the reaction member. "Around" and "about" may mean an inside arrangement as well as an outside. That is, gears 23 are arranged "around" or "about" annular gear 26 just as truly as they are arranged "around" or "about" spur gear 21. "Carried" and "supported" mean held in working position, though not necessarily by upward pressure. For instance, if any one of the gears 23 were taken off, the other two gears 23 would not mesh properly with gear 21 and drive. Hence, the three gears 23 are "carried" or "supported" by the gear 21, even though the gear 21 presses downward on one of them. "Gear member" is used more broadly than the term "gear," and means herein a single gear, or a gear mounted on a shaft, two gears integral or mounted on a shaft, as is common practice, especially in planetary gearing, or other simple mounting of gear. "Connection" and "engagement" are used broadly to mean members co-operating, as lever 58 and reaction lug 41A; not necessarily interlocking members. "Motor shaft" is used to mean the shaft of any kind of motor; not necessarily an electric motor as shown.

It will be understood that my speed reducer may be made in many forms and styles, and still come within the spirit of my invention. The description is to be broadly construed. Hence, I do not limit myself to the embodiment herein shown, but only by the following claims.

Having thus described my invention, I claim:
1. A speed reducer comprising a motor shaft; a bearing; a reaction member; a gear connection from said motor shaft to said reaction member; said reaction member having one end adjacent said motor shaft and supported by said shaft through said gear connection, and having its opposite end journaled on and supported by said bearing, and said reaction member being rotatable on said motor shaft and said bearing through a partial revolution; a driven member; a drive connection through the gear connection aforesaid from said motor shaft to said driven member; a yielding member in line with said bearing; and a connection from said yielding member to said reaction member.

2. In combination, a gear train comprising a gear centered on the axis of said train and adjacent one end thereof, gear members in engagement with said gear, and said gear supporting the adjacent end of the train through said gear members; a reaction member in engagement with said gear members, said reaction member having one end adjacent said gear first aforesaid, and having that end supported by said gear through said gear members; resilient means to restrain the rotation of said reaction member; and a variable lever in said means increasing the restraint as the torque increases.

3. A speed reducer symmetrical on forward and backward drive and comprising a driving shaft; a bearing; a reaction member, said reaction member including a casing adapted to hold oil, and having one end adjacent to said driving shaft and an opposite end journaled on and supported by said bearing; a gear on said driving shaft; three gears approximately 120 degrees apart and in mesh with the gear aforesaid; connections from said three gears to said reaction member, the driving shaft adapted to support the adjacent end of said reaction member through the gears aforesaid, and said reaction member being rotatable on said driving shaft and said bearing through a partial revolution; a driven member; a gear connection through the gears aforesaid from said driving shaft to said driven member; a yielding member opposite said bearing; and a connection from said yielding member to said reaction member.

4. A speed reducer symmetrical on forward and backward drive and comprising a motor shaft; a driven shaft; a reaction member; a gear connection from said motor shaft to said driven shaft, said reaction member being in engagement with said gear connection, having one end adjacent said motor shaft and having that end supported by said motor shaft through said gear connection, and said reaction member being rotatable on said motor shaft through a partial revolution; a yielding member; a lever on the reaction member in engagement with the yielding member, and the leverage variable as the reaction member rotates.

5. A speed reducer comprising a shaft; a reaction member having one end adjacent to said shaft; a connection from said shaft to the adjacent end of the reaction member, said shaft adapted to support said adjacent end through said connection, and said reaction member adapted to rotate on said shaft through a partial revolution; a second shaft; a drive connection between the two shafts; a yielding member; and a connection from the yielding member to the reaction member.

6. A speed reducer comprising a shaft; a joint flexible in all directions; a reaction member; a gear connection from said shaft to said reaction member; said reaction member having one end adjacent said shaft and supported by said shaft through said gear connection, and having its opposite end in engagement with and supported by said flexible joint; a second shaft; a drive connection between the two said shafts through the gear connection aforesaid; a fixed member; and a flexible connection from the fixed member to the reaction member.

7. A speed reducer comprising a shaft; a joint flexible in all directions; a reaction member; a gear connection from said shaft to said reaction member; said reaction member having one end adjacent said shaft and supported by said shaft through said gear connection, having its opposite end in engagement with and supported by said flexible joint, and said reaction member being rotatable on said shaft and said flexible joint through a partial revolution; a second shaft; a drive connection between said shafts through the gear connection aforesaid; a yielding member; and a connection from said yielding member to said reaction member.

8. A speed reducer symmetrical on forward and backward drive and comprising a motor shaft; a bearing having external and internal bearing surfaces; a reaction member; a drive connection from said motor shaft to said reaction member; said reaction member having one end adjacent said motor shaft and supported by said motor shaft through said drive connection, and having its opposite end journaled on and supported by said external bearing surface, and said reaction member adapted to rotate through a partial revolution on said motor shaft and said external bearing surface; a driven member journaled on said internal bearing surface; a drive connection from said motor shaft to said driven member through the drive connection aforesaid; a yielding member opposite said external bearing surface, and a connection from said yielding member to said reaction member.

9. In combination, a driving member; a driven member; a reaction member; a reversible drive connection from said driving member to said driven member through said reaction member; said reaction member having a neutral position under no torque, a forward position under torque in one direction, and a back position under torque in the opposite direction; a yielding connection from a fixed object to said reaction member in its neutral and forward positions only; and a yielding connection from a fixed object to said reaction member in its neutral and back positions only.

10. In combination, a driving member; a driven member; a reaction member; a reversible drive connection from said driving member to said driven member through said reaction member; said reaction member having a neutral position under no torque, a forward position under torque in one direction, and a back position under torque in the opposite direction; a yielding connection from a fixed object to said reaction member in its neutral and forward positions only; a yielding connection from a fixed object to said reaction member in its neutral and back positions only; levers in said yielding connections; and the leverage of said yielding connections increasing as the said reaction member moves away from its neutral position.

11. In combination, a gear; a shaft member; a reaction member; a drive connection from said gear to said shaft member through said reaction member, said drive connection having one end supported by said gear, and said reaction member having one end adjacent said gear and supported by said gear through said drive connection; said reaction member having a neutral position under no torque, a forward position under torque in one direction, and a back position under torque in the opposite direction; a yielding connection from a fixed object to said reaction member in its neutral and forward positions only; and a yielding connection from a fixed object to said reaction member in its neutral and back positions only.

12. In combination, a planetary gear train comprising a gear rotating on the axis of said train and adjacent one end thereof and planetary gear members in driving engagement with said gear; a reaction gear in driving engagement with said planetary gear members; a yielding connection from said reaction gear to a fixed object; and said gear first aforesaid supporting the adjacent end of the mechanism through said planetary gear members.

13. In combination, a planetary gear train comprising a gear rotating on the axis of said train and adjacent one end thereof and three planetary gear members arranged around said gear and in driving engagement therewith; an annular reaction gear in driving engagement with said three planetary gear members; a yielding connection from said reaction gear to a fixed object; and said gear first aforesaid supporting the adjacent end of the mechanism through said planetary gear members.

14. In combination, a gear train comprising a gear centered on the axis of said train and adjacent one end thereof, gear members in engagement with said gear, and said gear supporting the adjacent end of the train through said gear members; and a reaction member in engagement with said gear members, said reaction member having one end adjacent to said gear first aforesaid, and having that end supported by said gear through said gear members.

15. In combination, a gear train comprising a gear centered on the axis of said train and adjacent one end thereof, gear members in engagement with said gear, and said gear supporting the adjacent end of the train through said gear members; a reaction member in engagement with said gear members, said reaction member having one end adjacent said gear first aforesaid, and having that end supported by said gear through said gear members; a yielding connection from said reaction member to a fixed object; and said combination symmetrical on forward and backward drive.

16. In combination, a driving gear; three gear members arranged therearound, in driving engagement therewith, and supported thereby; a driven member; a reaction member, said reaction member being in engagement with said gear members, said reaction member having one end adjacent said driving gear, and having that end supported by said driving gear through said gear members; a drive connection from said gear members to said driven member through said reaction member; a yielding connection from said reaction member to a fixed object; and said combination being symmetrical on forward and backward drive.

17. In combination, a gear train comprising a gear centered on the axis of said train and adjacent one end thereof, three gear members arranged around and in engagement with said gear, and said gear supporting the adjacent end of the train through said three gear members; a reaction member in engagement with said three gear members, said reaction member having one end adjacent said gear first aforesaid and having said adjacent end supported by said gear through said three gear members; and a yieldable connection from said reaction member to a fixed object.

18. A speed reducer comprising a motor shaft; a bearing; a gear train having one end adjacent said motor shaft and supported by said shaft, and having its opposite end adjacent said bearing and supported by said bearing; a reaction member rotatable through a partial revolution and in engagement with said gear train; and a resilient connection from said reaction member to a fixed object.

19. A speed reducer comprising a motor shaft; a bearing; a gear train comprising sets of gears in sequence, having one end of said train adjacent said motor shaft and supported by said shaft, and having its opposite end adjacent said bearing and supported by said bearing; and a reduction member in engagement with said gear train.

20. A speed reducer comprising a motor shaft; a joint flexible in all directions; a gear train having one end adjacent said motor shaft and supported by said shaft, and having its opposite end adjacent said flexible joint and supported by said joint; a reaction member rotatable through a partial revolution and in engagement with said gear train; and a resilient connection from said reaction member to a fixed object.

21. A speed reducer comprising a motor shaft; a joint flexible in all directions; a gear train comprising sets of gears in sequence, having one end of said train adjacent said motor shaft and supported by said shaft, and having its opposite end adjacent said flexible joint and supported by said joint; and a reaction member in engagement with said gear train.

JOHN W. KITTREDGE.